United States Patent
Yano et al.

(10) Patent No.: US 7,038,903 B2
(45) Date of Patent: May 2, 2006

(54) SOLID ELECTROLYTIC CAPACITOR AND MANUFACTURING METHOD THEREOF

(75) Inventors: Mutsumi Yano, Hirakata (JP); Kazuhiro Takatani, Takasuki (JP); Mamoru Kimoto, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/808,395

(22) Filed: Mar. 25, 2004

(65) Prior Publication Data

US 2004/0190226 A1    Sep. 30, 2004

(30) Foreign Application Priority Data

Mar. 28, 2003  (JP) ............................. 2003-091398
Feb. 19, 2004  (JP) ............................. 2004-043598

(51) Int. Cl.
*H01G 9/04*     (2006.01)
*H01G 9/145*    (2006.01)

(52) U.S. Cl. ........................... 361/528; 361/532
(58) Field of Classification Search ........ 361/523–524, 361/528–533, 535–540
See application file for complete search history.

(56) References Cited

U.S. PATENT DOCUMENTS 6,215,652 B1   4/2001  Yoshida et al.
6,400,556 B1 *  6/2002  Masuda et al. ............. 361/523
6,473,293 B1 * 10/2002  Shimada et al. ............ 361/523
6,529,367 B1 *  3/2003  Naito et al. ................ 361/524
2005/0024810 A1 * 2/2005  Yuan .......................... 361/305

FOREIGN PATENT DOCUMENTS

| JP | 3-132011 | 6/1991 |
| JP | 11-329902 | 11/1999 |
| WO | WO 00/46819 | * 8/2000 |
| WO | WO 02/15208 A1 | * 2/2002 |

* cited by examiner

*Primary Examiner*—Eric W. Thomas
(74) *Attorney, Agent, or Firm*—McDermott Will & Emery LLP

(57) ABSTRACT

A solid electrolytic capacitor has an anode composed of a niobium substrate and a niobium nitride layer, and a dielectric layer composed of niobium oxide is formed on the surface of the niobium nitride layer. In the solid electrolytic capacitor, the nitrogen content based on the total weight of the niobium substrate, the niobium nitride layer, and the dielectric layer is preferably not less than 0.001% by weight nor more than 0.2% by weight. In another solid electrolytic capacitor, an anode is formed by sintering thermally treated niobium powder in a nitrogen atmosphere. A dielectric layer composed of niobium oxide is formed on the surface of the anode. In the solid electrolytic capacitor, the composition ratio X of the niobium powder ($NbN_X$) is preferably not less than 0.05 nor more than 1.0.

6 Claims, 7 Drawing Sheets

F I G. 3
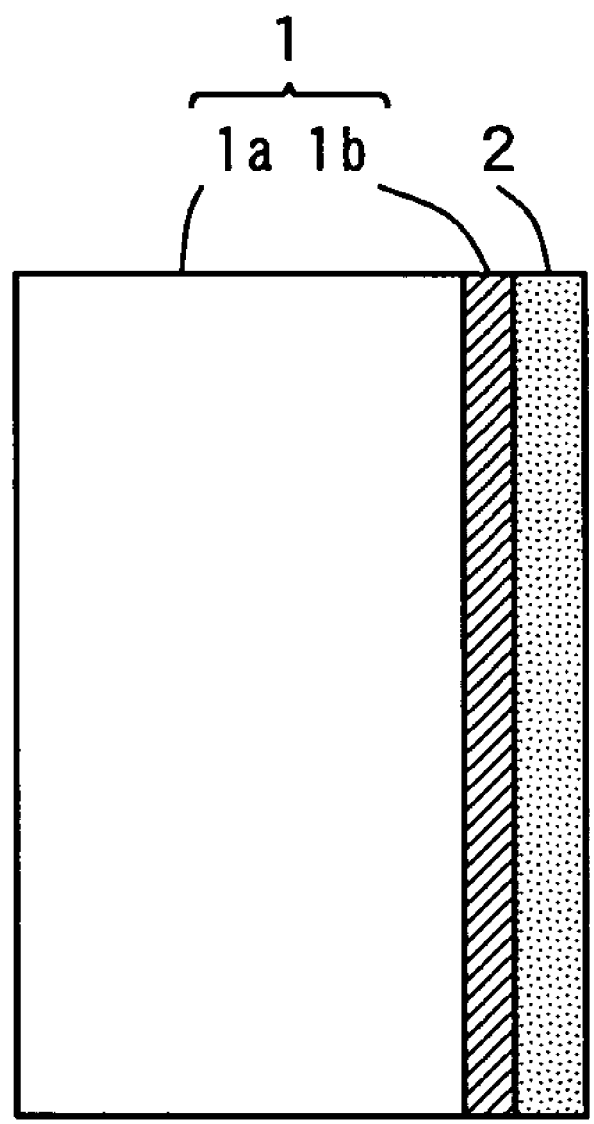

SOLID ELECTROLYTIC CAPACITOR AND MANUFACTURING METHOD THEREOF

BACKGROUND OF THE INVENTION

1. Field of the Invention

The present invention relates to a solid electrolytic capacitor and a manufacturing method thereof.

2. Description of the Background Art

Niobium has a dielectric constant about 1.8 times as large as that of tantalum which is a material for conventional solid electrolytic capacitors. Therefore, Niobium has been attracted much attention as a material for next-generation, high capacitance solid electrolytic capacitors.

However, when the solid electrolytic capacitor is subjected to high heat in a reflow soldering step, oxygen in a dielectric layer including niobium oxide is partly diffused into the anode and the thickness of the dielectric layer is reduced. As a result, leakage current is more likely to be caused in the dielectric layer.

In one suggested solid electrolytic capacitor, a niobium nitride region is formed in a niobium oxide layer as a dielectric in order to reduce changes in capacitance caused by oxygen diffusion in the reflow soldering step during mounting the solid electrolytic capacitor (see JP-11-329902-A).

In the conventional solid electrolytic capacitor provided with the nitride as described above, however, leakage current still cannot be sufficiently reduced.

SUMMARY OF THE INVENTION

It is an object of the present invention to provide a solid electrolytic capacitor with reduced leakage current and a manufacturing method thereof.

A solid electrolytic capacitor according to one aspect of the present invention includes a substrate composed of niobium a niobium nitride layer formed on the surface of a substrate, and a dielectric layer composed of niobium oxide formed on the surface of the niobium nitride layer.

In the solid electrolytic capacitor, the niobium nitride layer exists between the substrate composed of niobium and the dielectric layer composed of niobium oxide. The niobium nitride layer is chemically stable and has high heat resistance. Therefore, oxygen in the dielectric layer can be prevented from partly diffusing into the substrate when heating is carried out in the process of mounting. As a result, the thickness of the dielectric layer can be prevented from being reduced by oxygen diffusion. Consequently, leakage current can be reduced.

The substrate and the niobium nitride layer may constitute an anode. The dielectric layer is preferably nitrogen-free. In this way, the oxide region of the dielectric layer and the nitride region of the niobium nitride layer are clearly separated. In this way, the niobium nitride layer is formed densely and homogeneously, so that the niobium nitride layer can surely prevent oxygen in the dielectric layer from partly diffusing into the substrate. Therefore, the thickness of the dielectric layer can surely be prevented from being reduced by oxygen diffusion and leakage current can be even more reduced.

The niobium nitride layer is preferably substantially composed of $Nb_2N$. In this way, the $Nb_2N$ in the niobium nitride layer can surely prevent oxygen in the dielectric layer from partly diffusing into the substrate. Therefore, the thickness of the dielectric layer can surely be prevented from being reduced by oxygen diffusion, so that leakage current should sufficiently be reduced.

The nitrogen content based on the total weight of the substrate, the niobium nitride, and the dielectric layer is preferably not less than 0.001% by weight nor more than 0.2% by weight. In this way, the $Nb_2N$ is formed densely and homogeneously in the niobium nitride layer, so that leakage current can sufficiently be reduced.

More preferably, the nitrogen content based on the total weight of the substrate, the niobium nitride, and the dielectric layer is not less than 0.001% by weight nor more than 0.08% by weight. In this way, the $Nb_2N$ is formed more densely and homogeneously in the niobium nitride layer, so that leakage current can be even more reduced.

A solid electrolytic capacitor according to another aspect of the present invention includes an anode composed of niobium nitride, and a dielectric layer composed of niobium oxide formed on the surface of the anode.

In the solid electrolytic capacitor, the anode is composed of niobium nitride. Niobium nitride that is chemically stable and has high heat resistance can prevent oxygen in the dielectric layer from partly diffusing into the anode when it is heated in the process of mounting. Consequently, the thickness of the dielectric layer can be prevented from being reduced by oxygen diffusion, so that leakage current can be reduced.

The niobium nitride includes $NbN_X$, where X is preferably not less than 0.05 nor more than 1. When X is less than 0.05, the composition of the niobium nitrides close to the composition of metal niobium, and therefore oxygen in the dielectric layer cannot be prevented from partly diffusing into the anode when heating is carried out in the process of mounting. Meanwhile, there is no such niobium nitride where X is more than 1. Therefore, when X is not less than 0.05, oxygen in the dielectric layer can be prevented from partly diffusing into the anode when heating is carried out in the process of mounting.

The niobium nitride includes $NbN_X$, where the X is more preferably not less than 0.05 nor more than 0.75. In this way, oxygen can more surely be prevented from partly diffusing into the anode. Therefore, leakage current can be even more reduced. Note that the value of X can be changed depending on the treatment time.

The anode may be composed of a mixture of a plurality of kinds of niobium nitride containing nitrogen in different composition ratios. Also in this way, oxygen in the dielectric layer can be prevented from partly diffusing into the anode.

A method of manufacturing a solid electrolytic capacitor according to yet another aspect of the present invention includes the steps of forming a dielectric layer composed of niobium oxide by oxidizing a surface of a substrate including niobium, forming a niobium nitride layer between the substrate and the dielectric layer by thermally treating the substrate having the dielectric layer formed thereon in a nitrogen atmosphere, and anodizing the dielectric layer.

According to the method of manufacturing a solid electrolytic capacitor, the niobium nitride layer is formed between the substrate including niobium and the dielectric layer including niobium oxide. The niobium nitride layer that is chemically stable and has high heat resistance can prevent oxygen in the dielectric layer from partly diffusing into the substrate when it is heated in the process of mounting. As a result, the thickness of the dielectric layer can be prevented from being reduced by oxygen diffusion. Consequently, leakage current can be reduced.

The temperature in the thermal treatment is preferably not lower than 300° C. nor higher than 920° C. In this way, $Nb_2N$ is formed densely and homogeneously in the niobium nitride layer, so that leakage current can sufficiently be reduced.

More preferably, the temperature in the thermal treatment is not lower than 300° C. nor higher than 800° C. In this way, the $Nb_2N$ is formed more densely and homogeneously in the niobium nitride layer, so that leakage current can be even more reduced.

A method of manufacturing a solid electrolytic capacitor according to a still further aspect of the present invention includes the step of forming a dielectric layer composed of niobium oxide on the surface of an anode composed of niobium nitride by oxidizing a surface of the anode.

According to the method of manufacturing a solid electrolytic capacitor, the dielectric layer is formed on the surface of the anode by oxidizing the surface of the anode including niobium nitride.

Niobium nitride that is chemically stable and has high heat resistance can prevent oxygen in the dielectric layer from partly diffusing into the anode. Therefore, the thickness of the dielectric layer can be prevented from being reduced by oxygen diffusion. Consequently, leakage current can be reduced.

According to the present invention, oxygen in the dielectric layer can be prevented from partly diffusing, and therefore the thickness of the dielectric layer can be prevented from being reduced, so that leakage current in the solid electrolytic capacitor can be reduced.

These and other objects and advantages of the present invention will become clear from the following description with reference to the accompanying drawings.

BRIEF DESCRIPTION OF THE DRAWINGS

FIG. 3 is a sectional view of the anode and dielectric of a capacitor in Inventive Example 1;

DETAILED DESCRIPTION OF THE PREFERRED EMBODIMENTS

Now, the invention will be described in detail with reference to embodiments, while the invention is by no means limited to the following embodiments and can be modified as required without changing the gist thereof.

(First Embodiment)

Figure 1:
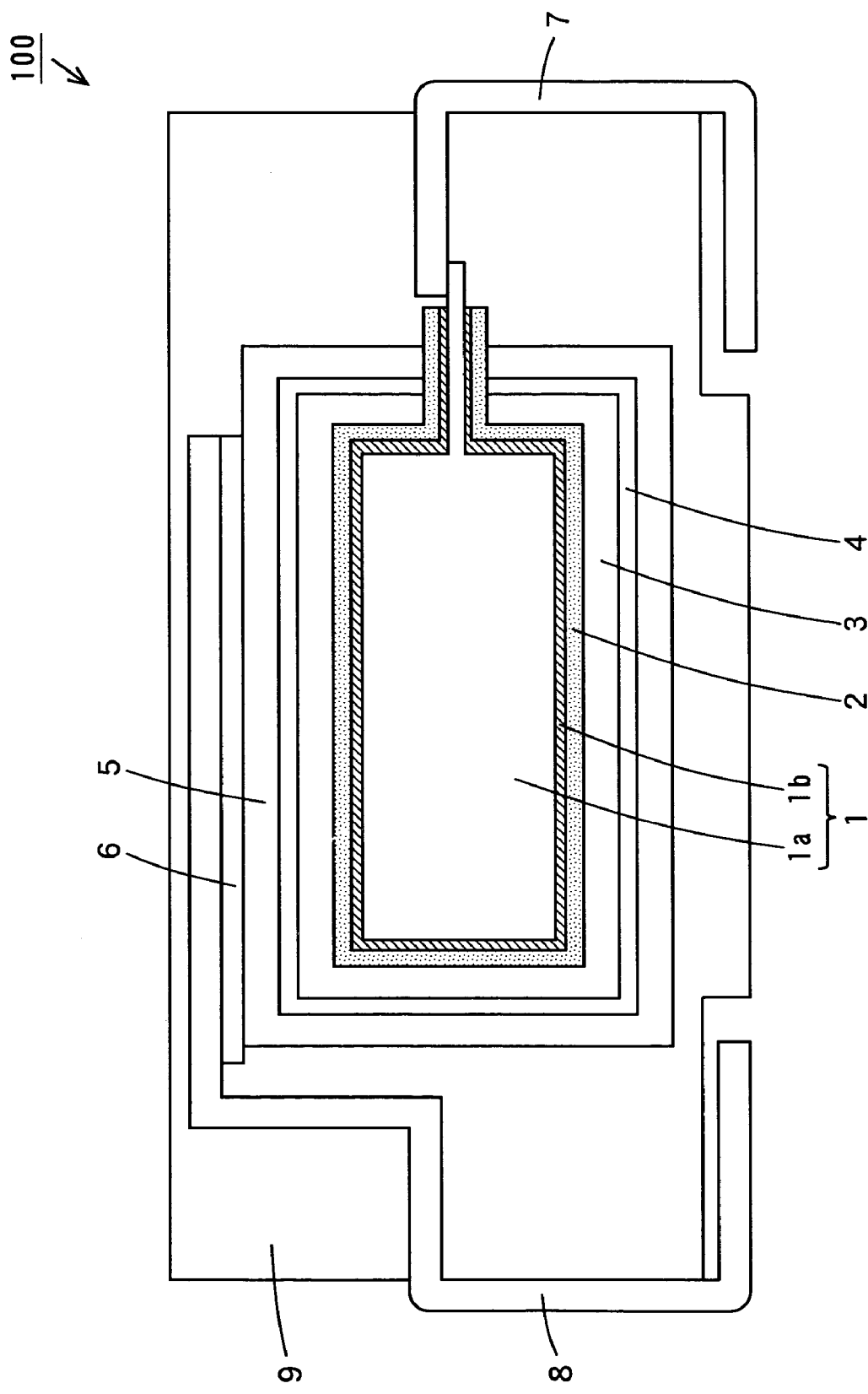
FIG. 1 is a view of a solid electrolytic capacitor according to a first embodiment of the invention.

FIG. 1 is a view of a solid electrolytic capacitor according to a first embodiment of the invention.

As shown in FIG. 1, in the electrolytic capacitor 100, a dielectric layer 2, a conductive polymer layer 3, a carbon layer 4, and a silver paint layer 5 are formed in this order on the surface of an anode 1. The anode 1 comprises a substrate of niobium (hereinafter referred to as "niobium substrate") 1a and a nitride layer 1b of $Nb_2N$.

The silver paint layer 5 is connected with a cathode terminal 8 through a conductive adhesive 6, and the niobium substrate 1a is connected with an anode terminal 7. Mold sheath resin 9 is formed so that the anode and cathode terminals 7 and 8 have their ends externally extended.

The niobium substrate 1a is composed of a porous sinter of niobium particles. The porous sinter of niobium particles has a large surface area and therefore allows a large capacitance. The dielectric layer 2 is composed of highly insulating niobium oxide ($Nb_2O_5$).

The conductive polymer layer 3 is composed of conductive polymer such as polypyrrole or polythiophene. Note that according to the embodiment, the conductive polymer layer 3 is used as electrolyte, but any other material such as manganese dioxide may be used as the electrolyte. The carbon layer 4 is made of carbon paste, and the silver paint layer 5 is made of silver paste produced by mixing silver particles, protective colloid and an organic solvent.

Now, a method of manufacturing the solid electrolytic capacitor 100 according to the embodiment of the invention will be described.

A niobium substrate 1a of porous sinter is formed by sintering powder of niobium particles. In this case, the niobium particles are welded with one another.

Then, the niobium substrate 1a is oxidized in an aqueous solution of phosphoric acid, so that the dielectric layer 2 of niobium oxide ($Nb_2O_5$) is formed on the surface of the niobium substrate 1a.

Then, the niobium substrate 1a having the dielectric layer 2 formed thereon is heated in a nitrogen atmosphere. In this way, the dielectric layer 2 is reduced, so that nitrogen is diffused into the niobium substrate 1a. Consequently, a niobium nitride layer 1b is formed on the surface of the niobium substrate 1a. Then, the niobium substrate 1a having the niobium nitride layer 1b formed thereon is again oxidized in an aqueous solution of phosphoric acid.

Then, the dielectric layer 2 has its surface coated with a conductive polymer layer 3 composed of conductive polymer such as polypyrrole or polythiophene by electrolytic polymerization or vapor phase polymerization. In this case, the conductive polymer layer 3 is formed on the surface of the dielectric layer 2 to fill in gaps in the dielectric layer 2 on the surface of the porous sinter.

Then, carbon paste is applied on the conductive polymer layer 3 and a carbon layer 4 is thus formed on the conductive polymer layer 3. Silver paste is applied on the carbon layer 4 and dried at a prescribed temperature, so that a silver paint layer 5 is formed on the carbon layer 4. The silver paint layer 5 is connected with the cathode terminal 8 through a conductive adhesive 6. The niobium substrate 1a is connected with the anode terminal 7.

Then, mold sheath resin 9 is formed so that the anode and cathode terminals 7 and 8 have their ends externally extended. By this method, the solid electrolytic capacitor 100 is prepared.

In the solid electrolytic capacitor 100, the niobium nitride layer 1b is formed between the niobium substrate 1a and the dielectric layer 2. The niobium nitride layer 1b is chemically stable and has high heat resistance, and therefore oxygen in the dielectric layer 2 can be prevented from partly diffusing into the niobium substrate 1a. Therefore, the thickness of the dielectric layer 2 is not reduced, and leakage current can be reduced.

Note that according to the embodiment, the niobium porous sinter is used as the niobium substrate 1a for the solid electrolytic capacitor, but any other type of material such as a niobium film may be used.

(Second Embodiment)

Figure 2:
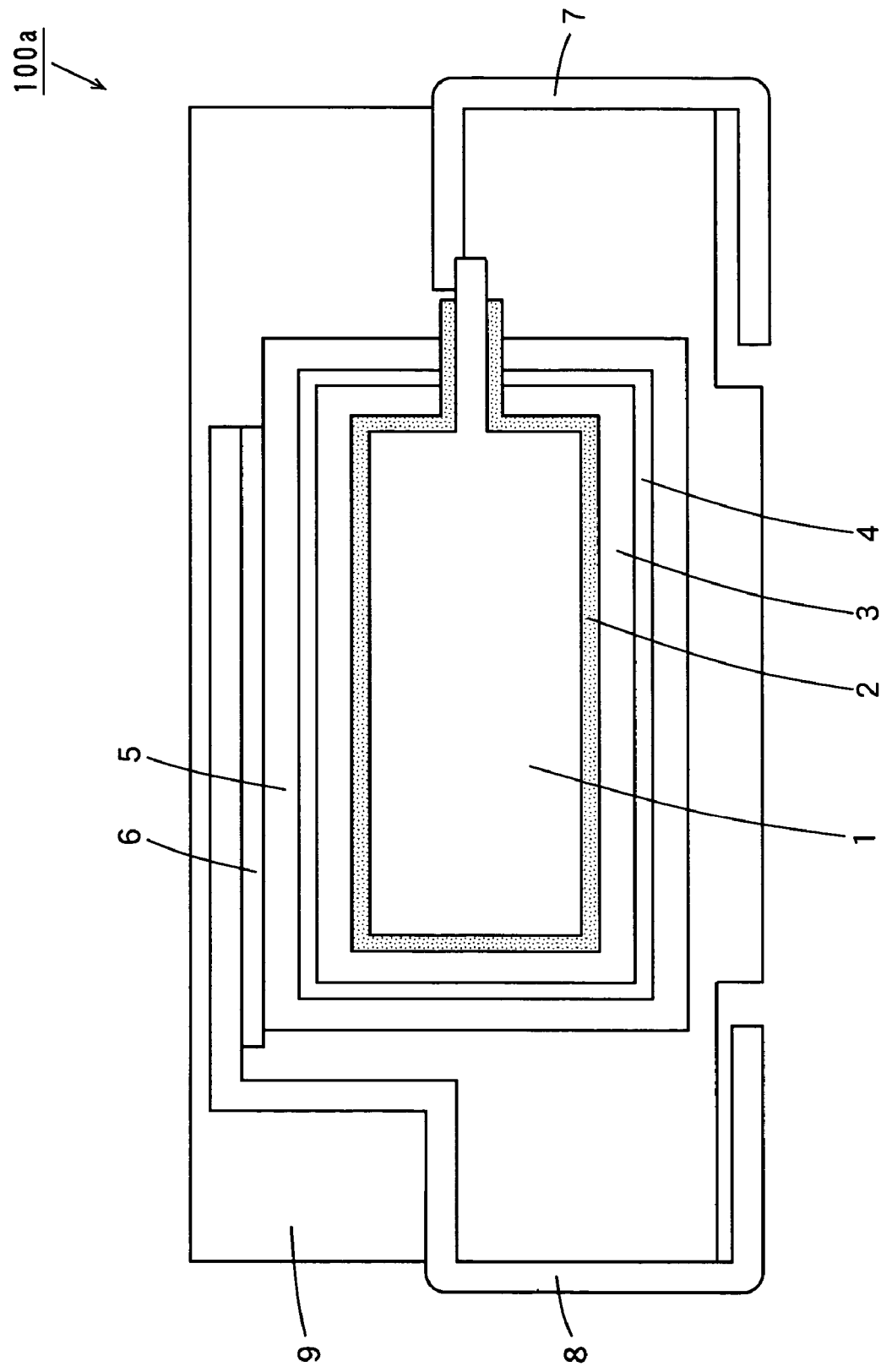
FIG. 2 is a view of a solid electrolytic capacitor according to a second embodiment of the invention.

FIG. 2 is a view of a solid electrolytic capacitor according to a second embodiment of the invention.

The solid electrolytic capacitor 100a shown in FIG. 2 is different from the solid electrolytic capacitor 100 shown in FIG. 1 in the following features. An anode 1 is composed of niobium nitride. A dielectric layer 2 composed of niobium oxide ($Nb_2O_5$) is formed on the surface of the anode 1.

Now, a method of manufacturing the solid electrolytic capacitor 100a according to the second embodiment will be described.

Powder of niobium particles is heated in a nitrogen atmosphere. An anode 1 of porous sinter is formed by sintering the heated niobium particle powder. In this case, the niobium particles are welded with each other.

Then, the anode 1 is oxidized in a phosphoric acid aqueous solution, so that a dielectric layer 2 including niobium oxide ($Nb_2O_5$) is formed on the surface of the anode 1.

Then, the dielectric layer 2 has its surface coated with a conductive polymer layer 3 composed of conductive polymer such as polypyrrole or polythiophene by electrolytic polymerization or vapor phase polymerization. In this case, the conductive polymer layer 3 is formed on the surface of the dielectric layer 2 to fill in gaps in the dielectric layer 2 on the surface of the porous sinter.

Then, carbon paste is applied on the conductive polymer layer 3 and a carbon layer 4 is thus formed on the conductive polymer layer 3. Silver paste is applied on the carbon layer 4 and dried at a prescribed temperature, so that a silver paint layer 5 is formed on the carbon layer 4. The silver paint layer 5 is connected to a cathode terminal 8 through a conductive adhesive 6. The anode 1 is connected with an anode terminal 7.

Then, mold sheath resin 9 is formed so that the anode and cathode terminals 7 and 8 have their ends externally extended. By this method, the solid electrolytic capacitor 100a is prepared.

In the solid electrolytic capacitor 100a according to the second embodiment, the anode 1 is composed of niobium nitride. Niobium nitride is chemically stable and has high heat resistance, and therefore oxygen in the dielectric layer 2 can be prevented from partly diffusing into the anode 1 in thermal treatment such as a reflow soldering step. Therefore, the thickness of the dielectric layer 2 is not reduced, and leakage current can be reduced.

EXAMPLES

In the following Inventive Examples 1 to 15, solid electrolytic capacitors were prepared according to the first embodiment described above and evaluated. In the following Inventive Examples 16 to 26, solid electrolytic capacitors according to the second embodiment were prepared and evaluated.

Inventive Example 1

In Inventive Example 1, a solid electrolytic capacitor as shown in FIG. 3 was prepared by the following method.

(Oxidizing Step 1)

A niobium film as thick as 0.1 mm was used as a niobium substrate 1a. The niobium substrate 1a was allowed to stand for 30 minutes for oxidization in a 0.5 wt % phosphoric acid aqueous-solution maintained at 60° C. at a constant voltage of 45 V, and a dielectric layer 2 composed of niobium oxide was formed on the surface of the niobium substrate 1a.

(Nitriding Step)

Now, the niobium substrate 1a having the dielectric layer 2 formed thereon was allowed to stand in an electric furnace maintained at 600° C. and 0.1 atmospheric pressure for five minutes. In this way, a niobium nitride layer 1b was formed between the niobium substrate 1a and the dielectric layer 2.

(Oxidizing Step 2)

The niobium substrate 1a was oxidized again in a 0.5 wt % phosphoric acid aqueous solution maintained at 60° C. In this way, the capacitor in Inventive Example 1 was prepared.

Comparative Example 1

In Comparative Example 1, using a niobium substrate of a niobium film as thick as 0.1 mm which was the same as the niobium substrate 1a in Inventive Example 1, only the oxidizing step 1 in Inventive Example 1 was carried out. In this way, the capacitor in Comparative Example 1 was prepared. More specifically, the capacitor in Comparative Example 1 does not have a niobium nitride layer.

Comparative Example 2

In Comparative Example 2, a capacitor was prepared according to the following method.

(Nitriding Step)

A niobium substrate of a niobium film as thick as 0.1 mm which was the same as the niobium substrate 1a in Inventive Example 1 was thermally treated for five minutes at 600° C. in a nitrogen atmosphere and a niobium nitride layer was thus formed on the surface of the niobium substrate.

(Oxidizing Step)

The niobium substrate is oxidized for 30 minutes in a 0.5 wt % phosphoric acid aqueous solution maintained at 60° C. and a constant voltage of 45 V and a dielectric layer composed of niobium oxide was formed on the surface of the niobium substrate. In this way, the capacitor in the Comparative Example 2 was prepared.

According to the method, niobium nitride should be formed in the dielectric layer composed of niobium oxide (see JP-11-329902-A).

(Evaluation)

The nitrogen concentration of the capacitor in Inventive Example 1 was quantitatively analyzed by thermal conductivity method (JIS G 1201). As a result, the capacitor in Inventive Example 1 contained 0.02 wt % nitrogen.

Then, the capacitor in Inventive Example 1 was identified by X-ray powder method. As a result, the diffraction patterns of niobium and $Nb_2N$ were observed. Similarly, the capacitor in Comparative Example 2 was identified, and as a result, the diffraction patterns of niobium and $Nb_2N$ were observed.

Then, the capacitors in Inventive Example 1 and Comparative Examples 1 and 2 were investigated for the distributed states of niobium, oxygen, and nitrogen by ESCA (Electron Spectroscopy for Chemical Analysis), and leakage current was measured.

Figure 4:
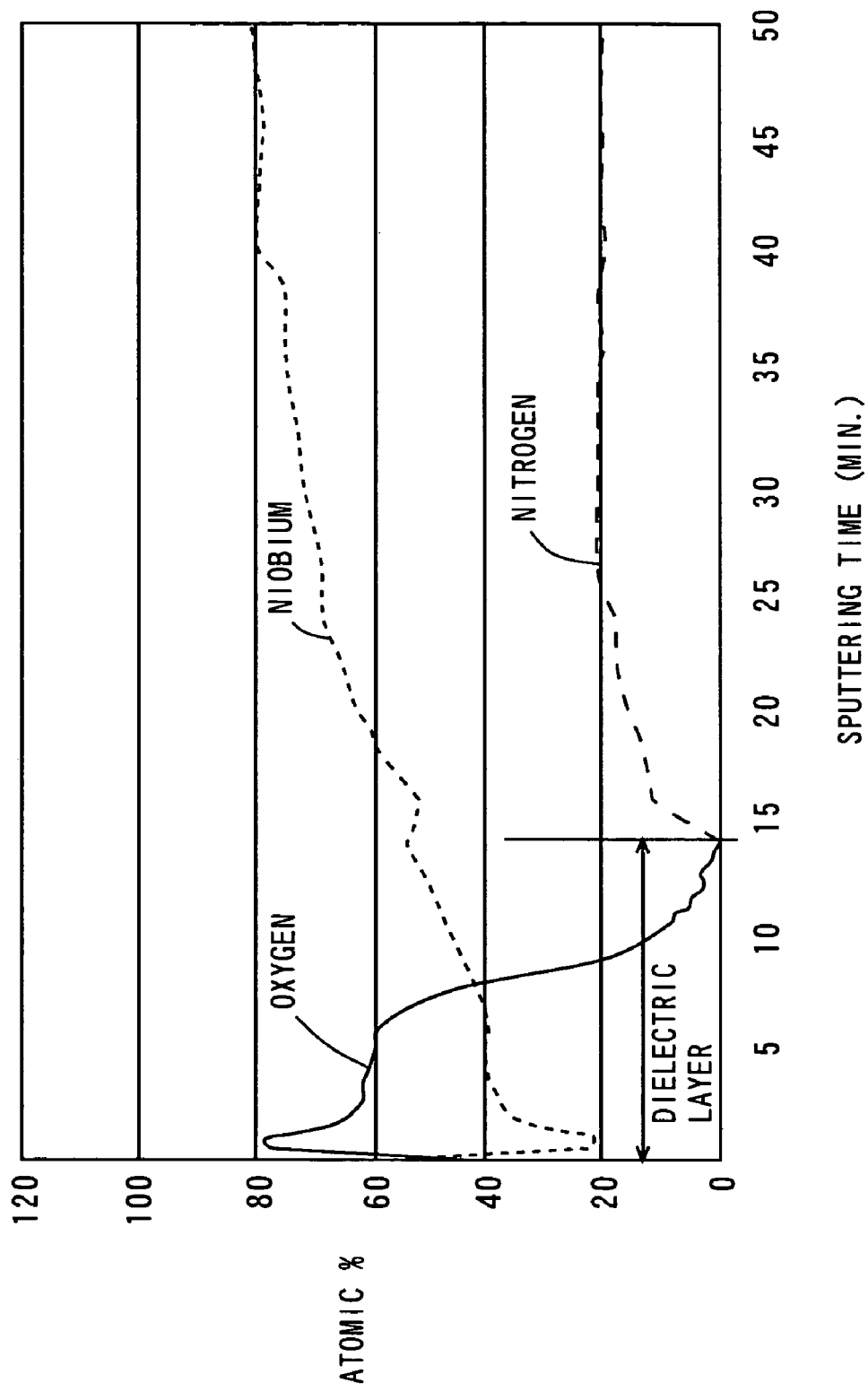
FIG. 4 is a graph showing a measurement result by ESCA for a capacitor in Inventive Example 1.
Figure 5:
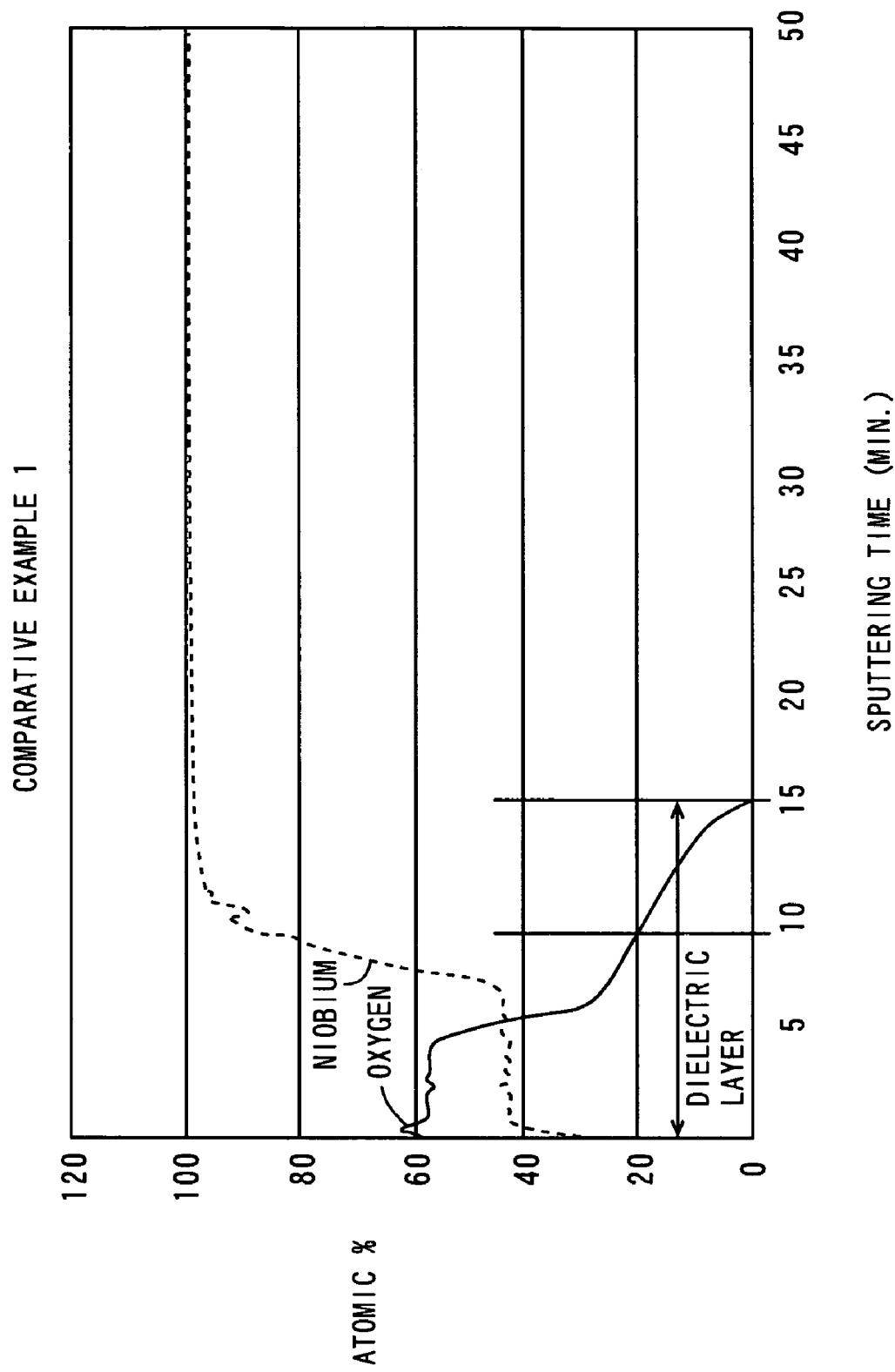
FIG. 5 is a graph showing a measurement result by ESCA for a capacitor in Comparative Example 1.
Figure 6:
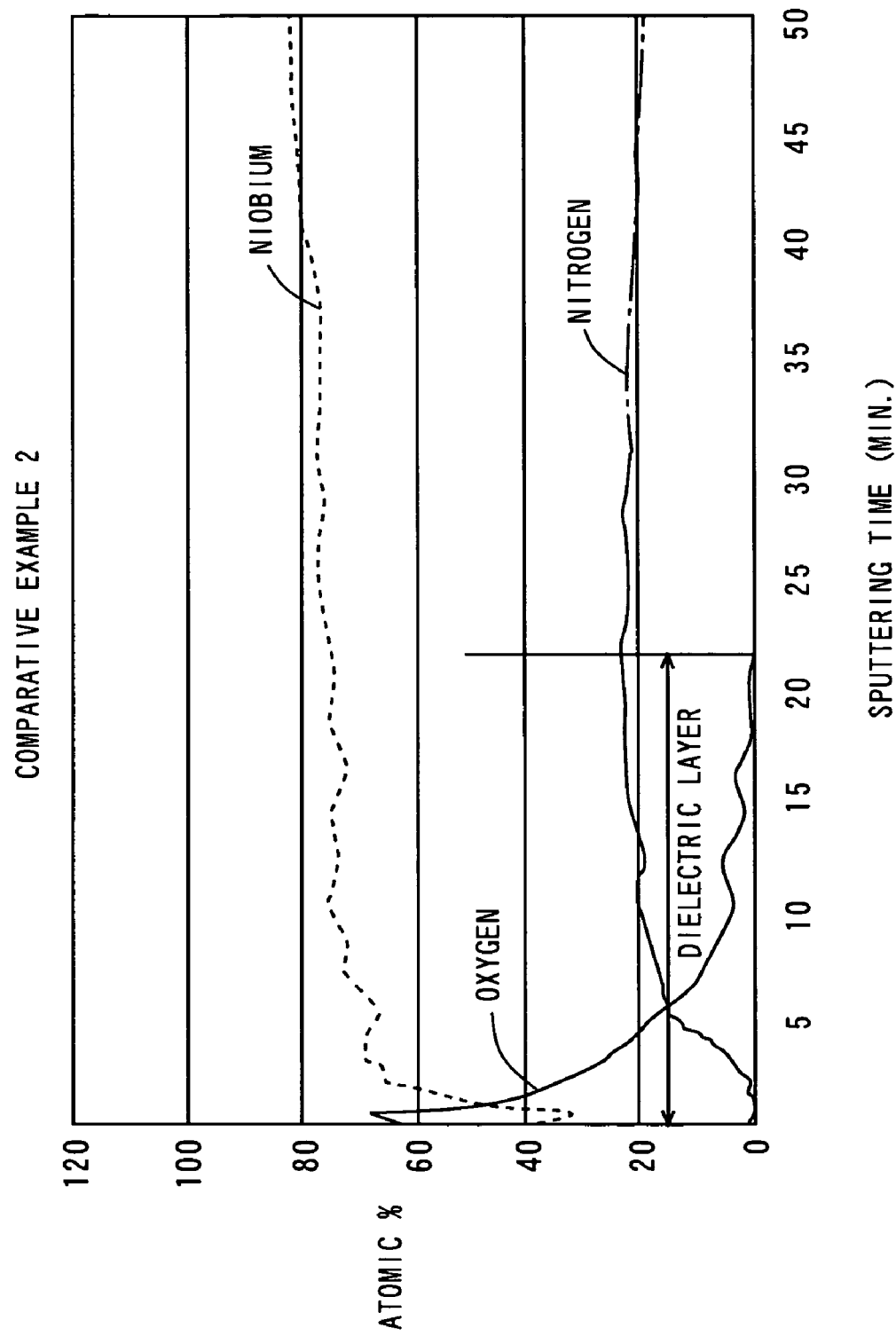
FIG. 6 is a graph showing a measurement result by ESCA for a capacitor in Comparative Example 2.

FIGS. 4, 5, and 6 are views showing the measurement results for the capacitors in Inventive Example 1 and Comparative Examples 1 and 2, respectively. In FIGS. 4, 5, and 6, the ordinate represents the contents of elements in each capacitor, and the abscissa represents sputtering time. The sputtering time corresponds to positions in the thickness-wise direction of the capacitor.

As shown in FIG. 4, the dielectric layer 2 of the capacitor in Inventive Example 1 contains oxygen and niobium and is nitrogen-free. Meanwhile, the niobium nitride layer 1b contains niobium and nitrogen and is oxygen-free. In this way, in the capacitor in Inventive Example 1, the dielectric layer 2 composed of niobium oxide and the niobium nitride layer 1b are clearly separated.

As shown in FIG. 5, the dielectric layer of the capacitor in Comparative Example 1 contains oxygen and niobium and is free from a niobium nitride layer. More specifically, the dielectric layer is directly formed on the surface of the niobium substrate.

As shown in FIG. 6, the dielectric layer of the capacitor in Comparative Example 2 contains oxygen, nitrogen, and niobium. The oxygen content is reduced and the nitrogen content increases from the surface to the inner side. More specifically, the capacitor in Comparative Example 2 has a region where both oxygen and nitrogen exist, in other words, the niobium oxide and the niobium nitride both exist.

Figure 7:
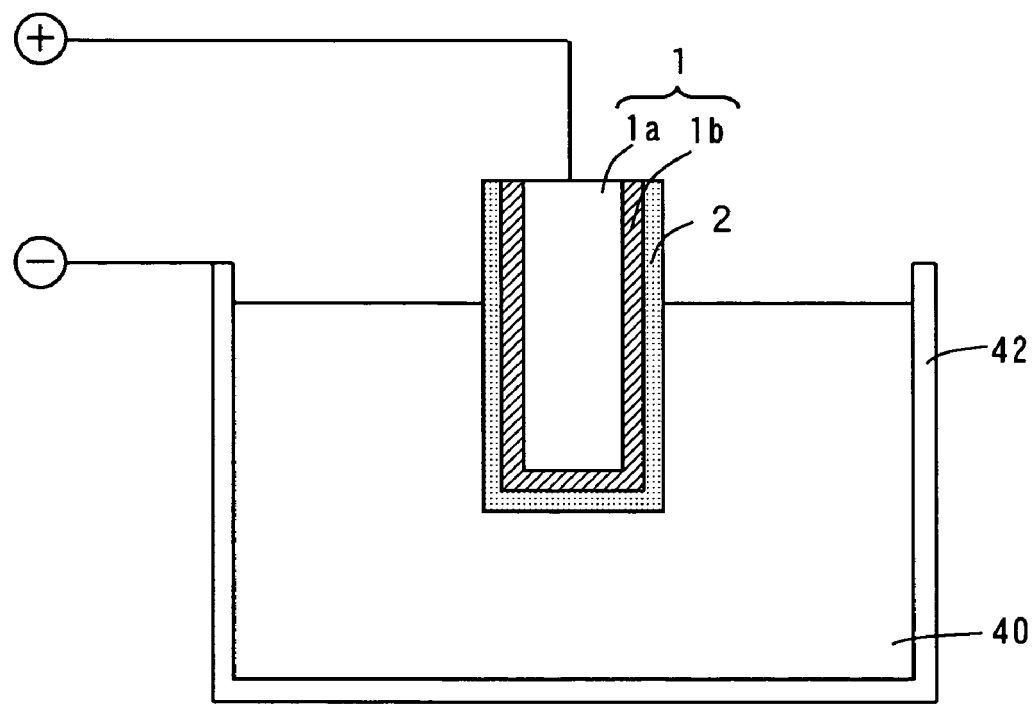
FIG. 7 is a schematic view for use in illustration of a method of measuring leakage current in the capacitor in Inventive Example 1.

Leakage current in the capacitors in Inventive Example 1 and Comparative Examples 1 and 2 after thermal treatment was measured. FIG. 7 is a schematic view of how leakage current in the capacitor in Inventive Example 1 was measured.

The capacitor in Inventive Example 1 was thermally treated for 30 minutes at 300° C.

Then, as shown in FIG. 7, a 0.5 wt % phosphoric acid aqueous solution 40 maintained at 60° C. was stored in a container 42, and the thermally treated capacitor in Inventive Example 1 was immersed in the phosphoric acid aqueous solution 40. In this state, a constant voltage of 10 V was applied and leakage current was measured 20 seconds after the application. The capacitors in Comparative Examples 1 and 2 were also measured for leakage current after thermal treatment. The result is shown in Table 1. Note that the respective the leakage current measurement results of the solid electrolytic capacitors of the inventive example 1 and comparative examples 1 and 2 are normalized by the leakage current measurement result of the solid electrolytic capacitor of the inventive example 1 as 100, and the normalized the leakage current values are represented in Table 1.

TABLE 1

|  | leakage current |
|---|---|
| Inventive Example 1 | 100 |
| Comparative Example 1 | 1000 |
| Comparative Example 2 | 600 |

As shown in Table 1, leakage current ten times as large as that of the capacitor in Inventive Example 1 was caused in the capacitor in Comparative Example 1. Leakage current six times as large as that of the capacitor in Inventive Example 1 was caused in the capacitor in Comparative Example 2. As can be understood from the results, in the capacitor in Inventive Example 1, the presence of the niobium nitride layer 1b formed between the niobium substrate 1a and the dielectric layer 2 reduces the leakage current.

Inventive Examples 2 to 15

In Inventive Examples 2 to 15, the correlation between the nitrogen content and leakage current was examined.

Here, in Inventive Examples 2 to 15, the treatment temperature in the nitriding step in the process of preparing a capacitor in Inventive Example 1 was changed in the range from 120° C. to 1000° C. The treatment temperatures in the nitriding step in Inventive Examples 2 to 15 were 120° C., 200° C., 250° C., 300° C., 600° C., 700° C., 800° C., 850° C., 870° C., 900° C., 920° C., 940° C., 970° C., and 1000° C., respectively. The other conditions were the same as those of Inventive Example 1. Note that the capacitor in Inventive Example 6 was the same as the capacitor prepared in Inventive Example 1.

(Evaluation)

For the capacitors in Inventive Examples 2 to 15, the nitrogen content, leakage current, and compounds identified by X-ray powder method are given in Table 2.

Note that the respective the leakage current measurement results of the solid electrolytic capacitors of the inventive examples 2 to 15 are normalized by the leakage current measurement result of the solid electrolytic capacitor of the inventive example 1 as 100, and the normalized the leakage current values are represented in Table 2.

TABLE 2

|  | leakage current | treatment temp. (° C.) | nitrogen content (wt %) | identified compounds |
|---|---|---|---|---|
| Inventive Example 2 | 450 | 120 | 0.0005 | Nb |
| Inventive Example 3 | 350 | 200 | 0.00075 | Nb |
| Inventive Example 4 | 300 | 250 | 0.00085 | Nb, $Nb_2N$ |
| Inventive Example 5 | 120 | 300 | 0.001 | Nb, $Nb_2N$ |
| Inventive Example 6 | 100 | 600 | 0.02 | Nb, $Nb_2N$ |
| Inventive Example 7 | 105 | 700 | 0.05 | Nb, $Nb_2N$ |
| Inventive Example 8 | 110 | 800 | 0.08 | Nb, $Nb_2N$ |
| Inventive Example 9 | 170 | 850 | 0.09 | Nb, $Nb_2N$ |
| Inventive Example 10 | 180 | 870 | 0.12 | Nb, $Nb_2N$ |
| Inventive Example 11 | 195 | 900 | 0.17 | Nb, $Nb_2N$ |
| Inventive Example 12 | 200 | 920 | 0.20 | Nb, $Nb_2N$ |
| Inventive Example 13 | 400 | 940 | 0.22 | Nb, $Nb_2N$, NbN |
| Inventive Example 14 | 450 | 970 | 0.25 | Nb, $Nb_2N$, NbN |
| Inventive Example 15 | 550 | 1000 | 0.45 | Nb, $Nb_2N$, NbN |

As can be seen from Table 2, the nitrogen content increases as the treatment temperature increases. Therefore, the nitrogen content can be controlled by adjusting the treatment temperature.

As the nitrogen content is in the range from 0.001 wt % to 0.20 wt %, the leakage current is sufficiently reduced. As the nitrogen content is in the range from 0.001 wt % to 0.08 wt %, the leakage current is considerably reduced.

Therefore, the nitrogen content is preferably not less than 0.001 wt % nor more than 0.20 wt %, more preferably not less than 0.001 wt % nor more than 0.08 wt %. The treatment temperature is preferably not lower than 300° C. nor higher than 920° C., more preferably not lower than 300° C. nor higher than 800° C.

When the nitrogen content was in the range from 0.00085 wt % to 0.20 wt %, Nb and $Nb_2N$ were detected. Meanwhile, when the nitrogen content was not less than 0.22 wt %, Nb, $Nb_2N$, and NbN were detected.

As can be seen from the above, when the niobium nitride layer 1b includes $Nb_2N$, the leakage current is reduced, and when the niobium nitride layer 1b contains NbN, the leakage current is less effectively reduced. It is assumed that this is because $Nb_2N$ has higher heat resistance than NbN, and can sufficiently prevent oxygen in the dielectric layer 2 from partly diffusing into the niobium substrate 1a.

Inventive Example 16

In Inventive Example 16, a solid electrolytic capacitor shown in FIG. 2 was prepared by the following method.

(Step of Producing Niobium Powder)

Niobium powder having an average particle size of 1 μm was thermally treated for one hour in a nitrogen atmosphere at 1000° C. and 0.1 atmospheric pressure.

(Step of Producing Niobium Nitride)

The thermally treated niobium powder was sintered and formed into an anode 1 composed of niobium nitride.

(Oxidizing Step)

The anode 1 was then oxidized for 10 hours in a 0.5 wt % phosphoric acid aqueous solution maintained at 60° C. at a constant voltage of 10 V, and a dielectric layer 2 composed of niobium oxide was formed on the surface of the anode 1.

(Step of Producing Solid Electrolytic Capacitor)

The dielectric layer 2 had its surface coated with a conductive polymer layer 3 composed of polypyrrole by electrolytic polymerization. In this case, the conductive polymer layer 3 was formed on the surface of the dielectric layer 2 to fill in gaps in the dielectric layer 2 on the surface of the porous sinter. Then, carbon paste was applied on the conductive polymer layer 3, and a carbon layer 4 was thus formed on the conductive polymer layer 3. Silver paste was applied on the carbon layer 4 and dried, and a silver paint layer 5 was thus formed. The silver paint layer 5 was connected with a cathode terminal 8 through a conductive adhesive 6. Then, the anode 1 was connected with an anode terminal 7. In this way, the solid electrolytic capacitor 100a shown in FIG. 2 was prepared.

Comparative Example 3

In Comparative Example 3, a solid electrolytic capacitor was prepared by the following method.

In Comparative Example 3, an anode was formed by sintering niobium powder having an average particle size of 1 μm without thermal treatment in a nitrogen atmosphere. Then, similarly to Example 16, the oxidizing step and the step of preparing the solid electrolytic capacitor were carried out and the solid electrolytic capacitor was preparing.

Comparative Example 4

In Comparative Example 4, a solid electrolytic capacitor was prepared by the following method.

In Comparative Example 4, an anode was formed by sintering niobium powder having an average particle size of 1 μm without thermal treatment in a nitrogen atmosphere. Then, the anode was held for five minutes in a nitrogen atmosphere at 300 Torr and 300° C., and similarly to Example 16, the oxidizing step and the step of preparing the solid electrolytic capacitor were carried out. In this way, the solid electrolytic capacitor was prepared.

(Evaluation)

The composition ratio of the product was calculated based on change in the weight of the niobium powder thermally treated in Inventive Example 16 before and after the thermal treatment. The nitrogen content corresponds to the change in the weight of the niobium powder before and after the thermal treatment. The composition ratio of the product is represented by the ratio of the result of dividing the weight of the niobium powder before the thermal treatment by the atomic weight of niobium and the result of dividing the nitrogen content by the atomic weight of nitrogen.

The nitrogen content=the weight of niobium powder after thermal treatment−the weight of niobium powder before the thermal treatment (1)

The composition ratio of product=(the weight of niobium powder before thermal treatment/the atomic weight of niobium): (the nitrogen content/the atomic weight of nitrogen) (2)

The composition ratio X of niobium powder ($NbN_X$) thermally treated in Example 16 was 0.2 according to the above expressions (1) and (2) (X=0.2).

When a section of the niobium powder particles was analyzed by electronic energy loss spectroscopy (EELS), it was confirmed that nitrogen was distributed homogeneously within the particles.

When a section of the niobium powder particles in Comparative Example 4 was analyzed by electron energy loss spectroscopy (EELS), nitrogen was distributed only on the surface of the particles.

Solid electrolytic capacitors in Inventive Example 16, and Comparative Examples 3and4were measured for leakage current after thermal treatment. The results are given in Table 3. The solid electrolytic capacitors in Inventive Example 16, and Comparative Examples 3 and 4 were thermally treated for 10 minutes at 250° C. and then supplied with voltage at 5 V, and then current 20 seconds later was measured. Note that the respective the leakage current measurement results of the solid electrolytic capacitors of the inventive example 16 and comparative examples 3 and 4 are normalized by the leakage current measurement result of the solid electrolytic capacitor of the comparative example 3 as 100, and the normalized the leakage current values are represented in Table 3.

TABLE 3

|  | leakage current |
| --- | --- |
| Inventive Example 16 | 50 |
| Comparative Example 3 | 100 |
| Comparative Example 4 | 90 |

As can be understood from Table 3, in the solid electrolytic capacitor in Comparative Example 3, current leakage twice as large as that of the solid electrolytic capacitor in Inventive Example 16 was caused. In the solid electrolytic capacitor in Comparative Example 4, leakage current 1.8 times as large as that of the solid electrolytic capacitor in Inventive Example 16 was caused.

As can be understood from the foregoing, in the solid electrolytic capacitor in Inventive Example 16 using niobium nitride for the anode 1, oxygen in the dielectric layer 2 is prevented from partly diffusing into the anode 1, so that the thickness of the dielectric layer 2 can be prevented from being reduced by oxygen diffusion.

Inventive Examples 17 to 25

In Inventive Examples 17 to 25, as the thermal treatment time in the step of producing niobium powder in Inventive Example 16 was changed in the range from five minutes to four hours, solid electrolytic capacitors were prepared. The thermal treatment time periods in Inventive Examples 17 to 25 were 5 minutes, 30 minutes, 45 minutes, 2 hours, 2.5 hours, 3 hours, 3.5 hours and 4 hours, respectively. The other conditions were the same as those of Inventive Example 16.

Inventive Example 26

In Inventive Example 26, a mixture of the thermally treated niobium powder in Inventive Example 16 and the thermally treated niobium powder (X=0.5) in Inventive Example 20 at a ratio of 1:1 was used. The other conditions were the same as those of Inventive Example 16 and a solid electrolytic capacitor was thus prepared.

(Evaluation)

The composition ratios X of thermally treated niobium powder in Inventive Examples 17 to 25 were 0.025, 0.05, 0.1, 0.2, 0.5, 0.65, 0.75, 0.9, and 1, respectively.

A section of the niobium powder particles ($NbN_X$) thermally treated in each of Inventive Examples 17 to 26 was analyzed by electron energy loss spectroscopy (EELS), and as a result, it was confirmed that nitrogen was homogeneously distributed within the particles.

The solid electrolytic capacitors in Inventive Examples 17 to 26 were measured for leakage current after thermal treatment. The measurement results are given in Table 4. Note that the respective the leakage current measurement results of the solid electrolytic capacitors of the inventive examples 17 to 26 are normalized by the leakage current measurement result of the solid electrolytic capacitor of the inventive example 1 as 100, and the normalized the leakage current values are represented in Table 4.

TABLE 4

|  | composition ratio | leakage current |
|---|---|---|
| Inventive Example 17 | 0.025 | 170 |
| Inventive Example 18 | 0.05 | 110 |
| Inventive Example 19 | 0.1 | 105 |
| Inventive Example 20 | 0.2 | 100 |
| Inventive Example 21 | 0.5 | 96 |
| Inventive Example 22 | 0.65 | 110 |
| Inventive Example 23 | 0.75 | 115 |
| Inventive Example 24 | 0.90 | 150 |
| Inventive Example 25 | 1.0 | 160 |
| Inventive Example 26 | Inventive Examples 20 and 21 mixed at 1:1 | 98 |

As can be understood from Table 4, leakage current can be reduced when the composition ratio X of niobium powder ($NbN_X$) is from 0.05 to 1.0. Furthermore, when the composition ratio X of niobium powder ($NbN_X$) is from 0.05 to 0.75, leakage current can be even more reduced.

It has also been found that when a mixture of different kinds of powder including niobium powder ($NbN_X$) whose composition ratio X is from 0.05 to 1.0 is used for the anode 1, the same effect can be provided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A solid electrolytic capacitor, comprising:
    a substrate composed of a porous sinter of niobium particles;
    a niobium nitride layer, substantially composed of $Nb_2N$, formed on the surface of and in direct contact with said niobium particles; and
    a dielectric layer composed of niobium oxide formed on the surface of said niobium nitride layer, wherein said dielectric layer is nitrogen-free.

2. The solid electrolytic capacitor according to claim 1, wherein
    said substrate and said niobium nitride layer constitute an anode.

3. The solid electrolytic capacitor according to claim 1, wherein the nitrogen content based on the total weight of said substrate, said niobium nitride, and said dielectric layer is not less than 0.001% by weight nor more than 0.2% by weight.

4. The solid electrolytic capacitor according to claim 1, wherein
    the nitrogen content based on the total weight of said substrate, said niobium nitride, and said dielectric layer is not less than 0.001% by weight nor more than 0.08% by weight.

5. A solid electrolytic capacitor, comprising: an anode composed of niobium nitride; and
    a dielectric layer composed of niobium oxide formed on the surface of said anode, wherein
    said niobium nitride is composed of $NbN_X$, where said X is not less than 0.05 nor more than 0.75.

6. The solid electrolytic capacitor according to claim 5, wherein
    said anode is composed of a mixture of a plurality of kinds of niobium nitride containing nitrogen in different composition ratios.

* * * * *

UNITED STATES PATENT AND TRADEMARK OFFICE
CERTIFICATE OF CORRECTION

| | |
|---|---|
| PATENT NO. | : 7,038,903 B2 |
| APPLICATION NO. | : 10/808395 |
| DATED | : May 2, 2006 |
| INVENTOR(S) | : Mutsumi Yano et al. |

Page 1 of 1

It is certified that error appears in the above-identified patent and that said Letters Patent is hereby corrected as shown below:

On the title page of the Letters Patent,

Under section "(75) Inventors", Second Inventor change "Takasuki" to -- Takatsuki --

Signed and Sealed this

Twenty-second Day of August, 2006

JON W. DUDAS
*Director of the United States Patent and Trademark Office*